United States Patent
Sigl et al.

[11] Patent Number: 5,113,963
[45] Date of Patent: May 19, 1992

[54] DRIVE SLIP CONTROL SYSTEM

[75] Inventors: Alfred Sigl, Sersheim; Johannes Schmitt, Schwieberdingen; Thomas Isella, Markgröningen, all of Fed. Rep. of Germany

[73] Assignee: Robert Bosch GmbH, Stuttgart, Fed. Rep. of Germany

[21] Appl. No.: 499,521

[22] PCT Filed: Dec. 8, 1988

[86] PCT No.: PCT/EP88/01123
§ 371 Date: Jun. 20, 1990
§ 102(e) Date: Jun. 20, 1990

[87] PCT Pub. No.: WO89/05743
PCT Pub. Date: Jun. 29, 1989

[51] Int. Cl.⁵ ............................................. B60K 28/16
[52] U.S. Cl. .................. 180/197; 364/426.03
[58] Field of Search .................. 180/197; 364/426.03; 123/352, 336

[56] References Cited

U.S. PATENT DOCUMENTS

| 4,361,871 | 11/1982 | Miller et al. | 364/426.03 |
| 4,682,667 | 7/1987 | Hosaka | 364/426.03 |
| 4,804,058 | 2/1989 | Leiber et al. | 180/197 |
| 4,866,618 | 9/1989 | Tamura et al. | 180/197 |

FOREIGN PATENT DOCUMENTS 99757  6/1985  Japan .................................. 180/197

Primary Examiner—Kenneth R. Rice
Assistant Examiner—Kevin Hurley
Attorney, Agent, or Firm—Felfe & Lynch

[57] ABSTRACT

The torque on at least one vehicle wheel is reduced when a potentially dangerous drive slippage is exceeded. The torque is then increased stepwise, the height of the steps being constant and the maintenance times between increases varying in dependence upon wheel slippage, vehicle acceleration, and/or the number of previous cycles.

14 Claims, 1 Drawing Sheet

DRIVE SLIP CONTROL SYSTEM

BACKGROUND OF THE INVENTION

Drive slip control systems vehicle are known, e.g. from U.S. Pat. No. 3,528,536, where at least one (usually two) driven wheels reduce the engine torque when a preset slippage threshold is exceeded. When the slippage value falls below this threshold, the engine torque is increased, for example, by changing the throttle position stepwise until at least one wheel is unstable again. This procedure is referred to as a control cycle which, in most cases, is repeated several times successively in a control procedure. In known systems, the height of the steps is continuously increased to obtain a progressive curve of increase of the engine torque curve.

SUMMARY OF THE INVENTION

The inventive control system maintains the height of the increasing steps constant but varies the maintenance times of constant torque between steps. This variation is then made to depend upon various conditions such as the slippage value, the vehicle acceleration and/or the number of cycles which already occurred in a control procedure. The maintenance time is calculated in each computation procedure, i.e. it is constantly adjusted to new road and vehicle conditions.

When the drive slip is high, close to the acceptable slippage limit, the maintenance times at the driven axle are extended since optimum slippage will soon be reached and a spinning (instability) of the driven wheels is about to occur. When the vehicle acceleration is high, the maintenance times are reduced (indication of high friction coefficient) since substantially more torque can be transmitted in this case.

A high vehicle acceleration is an indication of a high friction coefficient which permits a rapid increase without risking a spinning of the driven wheels. Low vehicle acceleration is caused either by a low friction coefficient or low engine torque.

When the engine torque is too low, the drive slippage is very small (close to 0 km/h) and, in this case, there is a rapid increase. A positive result thereof is improved traction when the friction coefficient has changed or when exiting a curve.

Allowing for the control cycles which already occurred in the control procedure permits a minute and careful approach to the optimum values of the engine torque so that the control vibrations decay faster and jolting is avoided. If a substantial slippage does not occur at the driven wheels (e.g. at μ-change) over a longer period of time in this condition, the number of control cycles which already occurred can be ignored for further calculation.

On the one hand, the vehicle acceleration can be analogously included in the calculation of the maintenance time, on the other hand, the maintenance time can be changed stepwise when discrete acceleration thresholds are exceeded. These discrete acceleration thresholds can be made to depend upon the vehicle speed (small acceleration at a high vehicle speed). It is also possible to change the maintenance time only after a prescribed threshold of the vehicle acceleration has been passed. This threshold too can be made to depend upon the speed of the vehicle.

DETAILED DESCRIPTION OF THE PREFERRED EMBODIMENT

Figure 1:
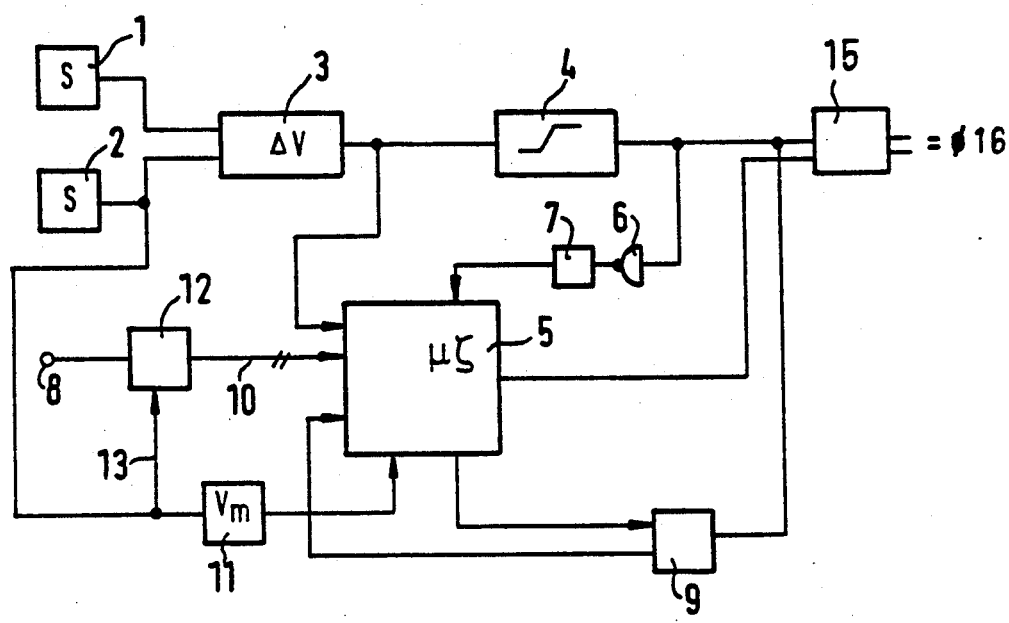
FIG. 1 is a block diagram of a drive slip control in accordance with the invention.

For reasons of simplicity FIG. 1 shows a drive slip control which acts only on the engine torque in case one of the wheels becomes instable. Only one sensor of a driven wheel is represented. The invention, however, can also be used with drive slip control systems when operating the brakes and acting upon the engine torque, the latter applies in particular when all driven wheels become unstable.

FIG. 1 shows a sensor 1 of a driven wheel and a sensor 2 of a non-driven wheel. The difference $\Delta V$ of the two wheel speeds is formed in a block 3. If this difference (it corresponds to the wheel slippage) exceeds a positive threshold (drive slippage) preset in comparator 4, a motor-driven actuator 15 changes the position of the throttle 12 and the engine torque is reduced (cf. period $t_1$ to $t_2$ in FIG. 2). The possibilities of the pedal acting upon the actuator or the throttle are not represented here. This possibility is interrupted during control.

The disappearance of the output signal of the comparator 4 activates, via an invertor 6 and a differentiator 7, a computer 5 which controls all the subsequent increases of the engine torque. The output signal of block 3 ($\Delta V$), the vehicle acceleration "a" of a terminal 8, the counting result of a counter 9, and a signal from comparator 11 are supplied to this computer. The longitudinal acceleration "a" of the vehicle is fed to an element 12 having several different thresholds.

Via a multiple line 10, the computer 5 is informed which threshold was just exceeded. The thresholds can also be affected by the vehicle speed (speed of the non-driven wheel) in that the thresholds are reduced with an increasing speed (line 13).

The counter 9 determines the number of control cycles which already occurred in the control procedure in that it counts the reducing signals at the output of a comparator 4. The counter 9 is reset by an output signal of the computer 5 when, for example, $\Delta V$ is small over a certain period of time or a control procedure has been completed.

Figure 2:
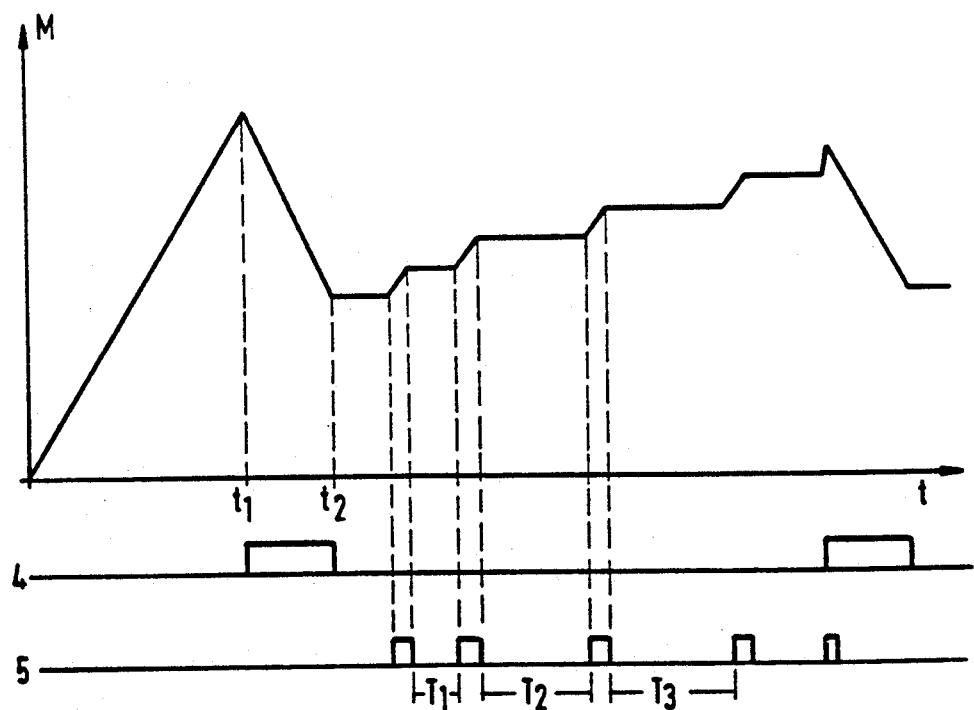
FIG. 2 shows the possible curve of a controlled engine torque.

Using the signal supplied, the computer 5 continuously calculates the maintenance time tH ($T_1$, $T_2$, $T_3$, . . . in line 5) to be inserted between two successive increase signals of the same width (cf. line 5 in FIG. 2).

The calculation can be carried out, for example, according to the following or a similar equation:

$$t_H = \frac{K_1 \Delta V}{a^*} + \frac{K_2 \cdot n}{a^*}$$

wherein $t_H$ is the maintenance time, $K_1$, $K_2$ are constant factors, $\Delta V = (VD - VND)$ is the difference of the driven axle speed to the non-driven axle speed, n is the number of the control cycles which already occurred in the control procedure (where n=1, if $\Delta V$ is small over a certain period of time) and a* is a signal which corresponds to the instantaneously valid vehicle acceleration.

The desired effects of the values ΔV, a*, and n have already been explained above. The stepwise torque increase ends when, in case of a new instability, a signal occurs at the output of comparator 4 and the computer 5 is deactivated again.

If a vehicle does not move after the vehicle is started (e.g. on a hill or in case of low $\mu$), this information is supplied to computer 5 via a comparator 11 with a very small comparative value. The computer then reduces the height of the steps of increase (hence the width of the pulses of line 5 of FIG. 2), for example in half, and thus supports departing by means of a slowly increasing and minute engine torque.

We claim:

1. Drive slip control system for a vehicle having an engine which develops engine torque to drive wheels which exhibit slippage and to impart a velocity and an acceleration to the vehicle, said system comprising means for determining the slippage of the driven wheels, means for determining the speed of the vehicle, means for reducing the engine torque when the slippage of a driven wheel exceeds a threshold, means for increasing the engine torque in steps when said slippage again falls below said threshold, the torque being maintained constant for a maintenance time between steps, each reduction in engine torque followed by a stepwise increase constituting a control cycle, said control cycles being repeated successively in a control procedure, means for counting the number of control cycles which have already occurred in a control procedure, said steps being of equal height throughout each control cycle, means for increasing the maintenance time between steps in response to at least one of an increase in the slippage and an increase in the number of control cycles, and means for decreasing the maintenance time between steps in response to a decrease in the slippage.

2. Drive slip control system as in claim 1 further comprising means for determining the acceleration of the vehicle, said means for increasing the maintenance time between steps increasing said maintenance time in response to at least one of an increase in the slippage, an increase in the number of control cycles, and a decreasing acceleration, said means for decreasing said maintenance time between steps decreasing said maintenance time in response to at least one of a decrease in the slippage and an increasing acceleration.

3. Drive slip control system in accordance with claim 2, wherein after reaching a preset threshold of the vehicle acceleration, the maintenance times are reduced.

4. Drive slip control system in accordance with claim 3 wherein the reduction in maintenance times is carried out stepwise when acceleration thresholds are exceeded.

5. Drive slip control system in accordance with claim 4 wherein in addition, the maintenance times depend upon the vehicle speed such that when an increasing vehicle speed, the maintenance times are reduced.

6. Drive slip control system in accordance with claim 5 wherein with an increasing vehicle speed, the acceleration thresholds are reduced.

7. Drive slip control system as in claim 1 further comprising means for reducing the height of the steps in a given control cycles so long as the vehicle speed has not yet reached a preset speed value.

8. Drive slip control system for a vehicle having an engine which develops engine torque to drive wheels which exhibit slippage and to impart a velocity and an acceleration to the vehicle, said system comprising means for determining the slippage of the driven wheels, means for determining the speed of the vehicle, means for reducing the engine torque when the slippage of a driven wheel exceeds a threshold, means for determining the vehicle acceleration, means for increasing the engine torque in steps when said slippage again falls below said threshold, the torque being maintained constant for a maintenance time between steps, each reduction in engine torque followed by a stepwise increase constituting a control cycle, said control cycles being repeated successively in a control procedure, means for counting the number of control cycles which have already occurred in a control procedure, said steps being of equal height throughout each control cycle, means for increasing the maintenance time between steps in response to at least one of an increase in the slippage and an increase in the number of control cycles, and means for decreasing the maintenance time between steps in response to an increase in the vehicle acceleration.

9. Method for controlling drive slippage in a vehicle having an engine which develops engine torque to drive wheels which exhibit slippage and to impart a velocity and an acceleration to the vehicle, said system comprising determining the slippage of the driven wheels, determining the speed of the vehicle, reducing the engine torque when the slippage of a driven wheel exceeds a threshold, increasing the engine torque in steps of equal height when said slippage again falls below said threshold, the torque being maintained constant for a maintenance time between steps, counting the number of times the engine torque is reduced followed by a stepwise increase, each time constituting a control cycle, increasing the maintenance time between steps in response to at least one of an increase in the slippage and an increase in the number of control cycles and a decreasing vehicle acceleration, and decreasing the maintenance time between steps in response to at least one of a decrease in the slippage and an increasing vehicle acceleration.

10. Method as in claim 9 wherein said maintenance times are reduced when a preset acceleration threshold is reached.

11. Method as in claim 10 wherein said maintenance times are reduced stepwise when acceleration thresholds are exceeded.

12. Method as in claim 11 wherein the maintenance times are reduced as the vehicle speed increases.

13. Method as in claim 12 wherein the acceleration thresholds are reduced as vehicle speed increases.

14. Method as in claim 9 wherein the height of the steps in a given control cycle is reduced for so long as the vehicle speed has not yet reached a preset speed value.

* * * * *

UNITED STATES PATENT AND TRADEMARK OFFICE
CERTIFICATE OF CORRECTION

PATENT NO. : 5,113,963
DATED : May 19, 1992
INVENTOR(S) : Sigl et al.

It is certified that error appears in the above-identified patent and that said Letters Patent is hereby corrected as shown below:

Column 2, line 24, "throttle 12" should be --throttle 16--.

Signed and Sealed this

Eleventh Day of January, 1994

Attest:

BRUCE LEHMAN

Attesting Officer

Commissioner of Patents and Trademarks